(12) United States Patent
Yano

(10) Patent No.: US 11,520,537 B2
(45) Date of Patent: Dec. 6, 2022

(54) INFORMATION PROCESSING APPARATUS HAVING COLOR PROFILING, METHOD FOR CONTROLLING SAME, AND STORAGE MEDIUM

(71) Applicant: CANON KABUSHIKI KAISHA, Tokyo (JP)

(72) Inventor: Takaaki Yano, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/177,347

(22) Filed: Feb. 17, 2021

(65) Prior Publication Data
US 2021/0294541 A1    Sep. 23, 2021

(30) Foreign Application Priority Data
Mar. 19, 2020    (JP) .............................. JP2020-049937

(51) Int. Cl.
*G06F 3/12*    (2006.01)

(52) U.S. Cl.
CPC .......... *G06F 3/1208* (2013.01); *G06F 3/1256* (2013.01); *G06F 3/1282* (2013.01)

(58) Field of Classification Search
None
See application file for complete search history.

(56) References Cited

U.S. PATENT DOCUMENTS

| | | | | |
|---|---|---|---|---|
| 9,346,282 B2* | 5/2016 | Page | ...................... | B41J 2/2107 |
| 2005/0206925 A1* | 9/2005 | Agehama | ................. | H04N 1/54 |
| | | | | 358/1.9 |
| 2005/0231576 A1* | 10/2005 | Lee | .......... | H04N 1/56 |
| | | | | 347/100 |
| 2006/0098233 A1* | 5/2006 | Jodra | ....................... | H04N 1/54 |
| | | | | 358/3.26 |
| 2008/0111998 A1* | 5/2008 | Edge | ........................ | H04N 1/52 |
| | | | | 358/1.9 |
| 2011/0141497 A1* | 6/2011 | Willamowski | ..... | H04N 1/00408 |
| | | | | 358/1.9 |
| 2011/0304866 A1* | 12/2011 | Sawada | ................. | G06F 3/1208 |
| | | | | 358/1.9 |
| 2012/0188596 A1* | 7/2012 | Niles | ..................... | G06F 3/1229 |
| | | | | 358/1.15 |
| 2012/0218572 A1* | 8/2012 | Kishino | ............... | H04N 1/6066 |
| | | | | 358/1.9 |
| 2012/0300232 A1* | 11/2012 | Kouguchi | ............ | H04N 1/6022 |
| | | | | 358/1.9 |
| 2014/0168712 A1* | 6/2014 | Smith | .................... | H04N 1/603 |
| | | | | 358/3.23 |

(Continued)

FOREIGN PATENT DOCUMENTS

JP    6476963 B2    3/2019

*Primary Examiner* — Henok Shiferaw
(74) *Attorney, Agent, or Firm* — Venable LLP

(57) ABSTRACT

An information processing apparatus includes at least one memory device that stores a set of instructions, and at least one processor that executes the set of instructions to receive, from a printing apparatus, an output profile of the printing apparatus, and receive, from an external apparatus, print data and quality requirement data including a spot color. A color profile to be used as a print setting is chosen based on the received output profile of the printing apparatus and the spot color included in the received quality requirement data.

11 Claims, 12 Drawing Sheets

(56) References Cited

U.S. PATENT DOCUMENTS

| | | | |
|---|---|---|---|
| 2015/0049921 A1* | 2/2015 | Crean | G06K 9/4652 |
| | | | 382/112 |
| 2016/0352976 A1* | 12/2016 | Kuroiwa | G06K 15/1878 |
| 2017/0054877 A1* | 2/2017 | Shibata | H04N 1/00058 |
| 2018/0285034 A1* | 10/2018 | Iwamoto | G06F 3/1208 |
| 2019/0037111 A1* | 1/2019 | Ezoe | H04N 1/6008 |
| 2020/0358911 A1* | 11/2020 | Kikuchi | G06F 3/1203 |
| 2020/0412915 A1* | 12/2020 | Suzuki | H04N 1/6027 |

* cited by examiner

FIG. 8

| SPOT COLOR SIMULATION |||||
|---|---|---|---|---|
| PRXID | JOB201906080020 ||||
| CUSTOMER NAME | XYZ TRAVEL INC. ||||
| SPOT COLOR NAME | SPOT 008C ||||
| TARGET COLOR VALUE L*a*b* | (78.97, 14.42, 91.77) | REQUEST LEVEL dE | 10.0 ||
| OUTPUT PROFILE | COLOR DIFFERENCE dE | SIMULATION COLOR VALUE L*a*b* | DETER- MINE | SELECT |
| PLAIN PAPER 1 | 12.71 | (78.27, 10.38, 79.74) | × | ☐ |
| USER PROFILE 1 | 14.59 | (76.76, 9.64, 78.16) | × | ☐ |
| USER PROFILE 2 | 8.48 | (76.89, 10.6, 84.48) | ○ | ☑ |

```xml
<PRX>
  <PRXInfo>
    <PRXId> JOB201906080020</PRXId>
  </PRXInfo>

<BuyerInfo>
    <CompanyName>XYZ TRAVEL INC.</CompanyName>
  </BuyerInfo>

<QualitySpecification>
    <CustomerJob>
      <QualityGoals>
        <Color>
          <ColorScore>
            <ColorScoringScale>
              <UoM>dE</UoM>
              <ParameterScore Rank="5">
                <ValueRange>3</ValueRange>
              </ParameterScore>
              <ParameterScore Rank="4">
                <ValueRange>6</ValueRange>
              </ParameterScore>
              <ParameterScore Rank="3">
                <ValueRange>10</ValueRange>
              </ParameterScore>
            </ColorScoringScale>
            <ScoringInfo>
              <MinimumAcceptableRank>3</MinimumAcceptableRank>
            </ScoringInfo>
          </ColorScore>
        </Color>
      </QualityGoals>
    </CustomerJob>
  </QualitySpecification>

<CxFReferenceData>
    <Object Name="SPOT 008C">
      <ColorCIELab>
        <L>78.97</L>
        <A>14.42</A>
        <B>91.77</B>
      </ColorCIELab>
    </Object>
  </CxFReferenceData>
</PRX>
```

INFORMATION PROCESSING APPARATUS HAVING COLOR PROFILING, METHOD FOR CONTROLLING SAME, AND STORAGE MEDIUM

BACKGROUND OF THE INVENTION

Field of the Invention

The present invention relates to an information processing apparatus, a method of controlling the same, and a storage medium.

Description of the Related Art

There are print service formats called print on demand (POD), production printing, and commercial printing. In these service formats, there is a customer (also referred to as an end user) who orders or requests printing and a printing company that provides a print product, and the customer orders the print product by providing the printing company with a specification of the print product that the customer is requesting, and if necessary, image data used in printing. The specification of the print product is an element that decides the print product content such as a type of sheet to use, a finishing setting like binding and stapling, or a number of sheets or copies to be printed. The printing company uses the requested content and image data, creates the print product, then delivers it to the customer.

In these commercial printing services, the printing company uses various devices and software in everything from receiving orders to delivering a print product. For example, in addition to a printing apparatus for printing on a sheet, a finisher for binding/stapling, and an inspection apparatus for examining/inspecting a print product are being used. In addition, a Web server for receiving orders for print products from customers and terminals and software for managing the production of the print products are also used. Also, there are a plurality of users of these devices and software. For example, there are an order receiver who manages orders and contacts customers, a process designer who designs operation processes for completing print products, an operator who operates a printing apparatus or an inspection apparatus, and a checker who checks the quality of the final print product. There are printing companies that have a plurality of production sites, and in such a case, the printing companies, based on order content, decide which production site to produce print products at.

In commercial printing services, quality conditions are often designated to the printing companies for print products by the customers. The quality conditions, unlike the specifications of print products, indicate conditions related to the quality of print products such as a position deviation amount of an image between the front and back side of a sheet or an amount of variation in a color value of an image or a logo present in a product, a color value of an image across a plurality of copies or a plurality of pages. There are various print products such as distribution items like flyers and pamphlets, photo albums, books, business cards, and exhibition panels, and because their uses and prices vary, their quality conditions also vary in their required conditions and standards.

To satisfy the quality conditions, operation processes and quality confirmation processes must be taken for the print product by the printing company. The operation process indicates an adjustment operation for each type of apparatus that is needed in order to satisfy quality conditions. For example, a color adjustment operation, for matching a specific color on a specific sheet of the printing apparatus based a sample printing result for which a customer's agreement has been obtained, is necessary. Alternatively, if front/back print misalignment of a sheet in the print product being restrained within a predetermined scope is a condition, an image text printing position adjustment operation is necessary. Furthermore, an adjustment result confirmation operation for confirming the state of the apparatus adjusted by such adjustment operations is included.

Meanwhile, the quality confirmation process is a process of confirming whether or not a produced print product meets a quality condition. For example, by an inspection operation after printing, print products that do not satisfy the printing conditions are determined to be defects and excluded. Regarding the inspection operation, there are cases where the checker themselves performs the examination, and there are cases where the examination is performed by an inspection apparatus automatically. Also, as necessary, a quality report indicating that a print product satisfies quality conditions is produced for a customer.

Each of the aforementioned steps is decided by the process designer in accordance with the type of the print product and the printing conditions. As described previously, the forms of print products that commercial printing services cover are various. Furthermore, the printing company often has many types of apparatuses, and a process designer is responsible for selecting an optimal apparatus from among those, and work for reflecting this selection in each process. Accordingly, the process designer needs to be highly skilled and experienced, and their workload was heavy.

Quality condition information and quality check result information that are necessary for the above-described process design and quality report generation were not defined conventionally in a unified information format. Accordingly, the printing company that receives the orders would receive quality conditions in a different information format from their multiple customers and needed to decide a process in accordance with each information format when designing the operation process. Also, from the perspective of the customer making the order, when making an order for a print product to multiple printing companies, it was cumbersome to send and receive quality conditions and quality reports in different information formats.

In Japanese Patent No. 6476963, a method of selecting a sheet to be used for printing based on a print quality level required at the time of printing is proposed. Specifically, sheet quality information for the image quality level, the front/back position accuracy level, and a post-processing adjustment level is held as sheet parameters, and a sheet that satisfies requirements is decided by comparing the required print quality level against the print data.

However, there is a problem in the foregoing conventional technique as is described below. At a commercial printing job site, sheets used for printing a product are often decided in advance. For example, in a photo book service, it is typical to decide the binding form and design format and type and size of sheets used in the front cover and body in advance or for a customer to select from among several types. Meanwhile, a method of satisfying quality conditions from the customer is to handle them in print settings of print data. For example, in regards to the tint, a selection of the color profile to be used in a color conversion for the time of printing processing is switched and adjustment is performed. Also, in the case where a spot color is being used for print data, an output color profile for more accurately reproducing the spot color may be selected. Even if a sheet to be used is decided, there are multiple color profiles that can be selected. Normally, the operator decides an optimal color profile by trial-and-error.

However, in the foregoing conventional technique, while it is possible to decide a sheet that can be used in the print data, the work by the operator for setting the optimal color profile was still necessary as it was conventionally. To decide the output color profile, the operator's work and skill are required, which put a burden on the operator. Also, it is difficult to confirm whether or not the selected output color profile is actually the optimal setting, and it necessitates specialized knowledge and ends up being dependent upon the capability of the operator.

SUMMARY OF THE INVENTION

The present invention enables realization of a mechanism for deciding an optimal output color profile for spot color data included in print data based on quality requirement data received together with print data and production system information.

One aspect of the present invention provides an information processing apparatus comprising: at least one memory device that stores a set of instructions; and at least one processor that executes the set of instructions to: receive, from a printing apparatus, one or more pieces of information related to the printing apparatus; receive, from an external apparatus, print data including quality requirement data; analyze the quality requirement data, and determine whether or not a predetermined quality item is required; and in a case where the predetermined quality item is determined to be required, decide a print setting that meets a quality standard for the predetermined quality item, based on the received one or more pieces of information related to the printing apparatus.

Another aspect of the present invention provides a method for controlling an information processing apparatus, the method comprising: receiving, from a printing apparatus, one or more pieces of information related to the printing apparatus; receiving, from an external apparatus, print data including quality requirement data; analyzing the quality requirement data, and determining whether or not a predetermined quality item is required; and in a case where the predetermined quality item is determined to be required, deciding a print setting that meets a quality standard for the predetermined quality item, based on the received one or more pieces of information related to the printing apparatus.

Still another aspect of the present invention provides a non-transitory program for causing a computer to execute each step of a control method for an information processing apparatus, the method comprising: receiving, from a printing apparatus, one or more pieces of information related to the printing apparatus; receiving, from an external apparatus, print data including quality requirement data; analyzing the quality requirement data, and determining whether or not a predetermined quality item is required; and in a case where the predetermined quality item is determined to be required, deciding a print setting that meets a quality standard for the predetermined quality item, based on the received one or more pieces of information related to the printing apparatus.

Further features of the present invention will become apparent from the following description of exemplary embodiments (with reference to the attached drawings).

BRIEF DESCRIPTION OF THE DRAWINGS

FIG. 8 is a view illustrating an example of a UI according to an embodiment.

FIG. 12 is a view illustrating an example of PRX data.

DESCRIPTION OF THE EMBODIMENTS

Figure 1:
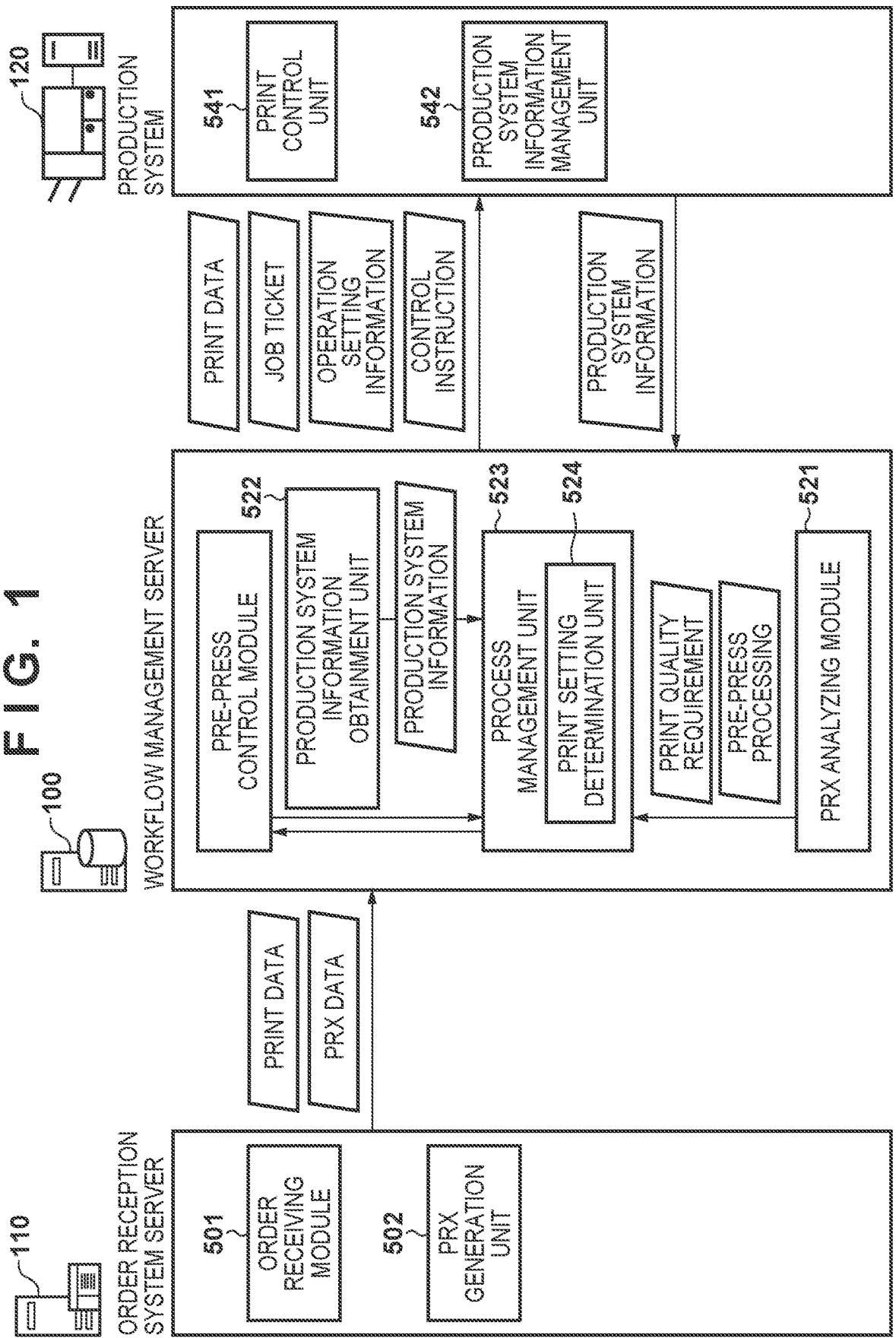
FIG. 1 is an overall schematic view according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<Overview of Printing System>

A first embodiment of the present invention will be described below. Firstly, with reference to FIG. 1, an overview of a printing system in the present embodiment will be described. The details of the role of each apparatus and the operation of the printing system will be described in detail from FIG. 2. In FIG. 1, a parallelogram item indicates data. This printing system is configured to include at least an order reception system server 110, a workflow management server 100, and a production system 120. The order reception system server 110 generates PRX data (quality requirement data), and transmits it to the workflow management server 100 together with print data. PRX is an abbreviation for Print Requirement eXchange format, and indicates a standardized data format of a quality condition required for printing. By using a PRX, it is possible to describe the quality conditions for different customers and different orders in a unified standardized data format.

The previously described process designer makes respective setting in relation to the print data so as to satisfy the designated quality conditions. By unifying the quality conditions that the purchaser of the print data (the customer) desires, it is thought that cases where quality conditions are designated by the customer via PRX will increase even more in the future at commercial printing sites. The workflow management server 100 analyzes the PRX data received from the order reception system server and generates print data, a job ticket, operation setting information, and control instruction that is based on the analysis result, and transmits it to the production system 120. The production system 120 receives the respective above-described data from the workflow management server 100, and executes a print job. Also, the production system 120 transmits production system information at an appropriate timing to the workflow management server 100. Here, appropriate timing basically means a timing in accordance with a request from the workflow management server 100, but it can mean a timing at which the production system information of the production system 120 is updated. Also, it is advantageous that the timing at which the workflow management server 100 makes the request be periodic such as once per day or once per week, for example. Also, the production system 120, after executing the printing, generates a PQX (quality report), and transmits it to the workflow management server 100. PQX is an abbreviation for Print Quality eXchange format, and is a standardized data format for print quality reports. PQX enables quality data of a print product to be transmitted in a standardized data format. Accordingly, it becomes possible to transmit a quality condition and a quality report, which conventionally has not been unified, in a unified information format by using PRX and PQX. Note that by virtue of the present embodiment, the workflow management server 100 decides the optimal print settings for the spot color data designated in the PRX data, based on the above-mentioned production system information obtained from the production system 120. Accordingly, it is advantageous that the above-mentioned production system information be the latest information.

<Configuration of Printing System>

Figure 2:
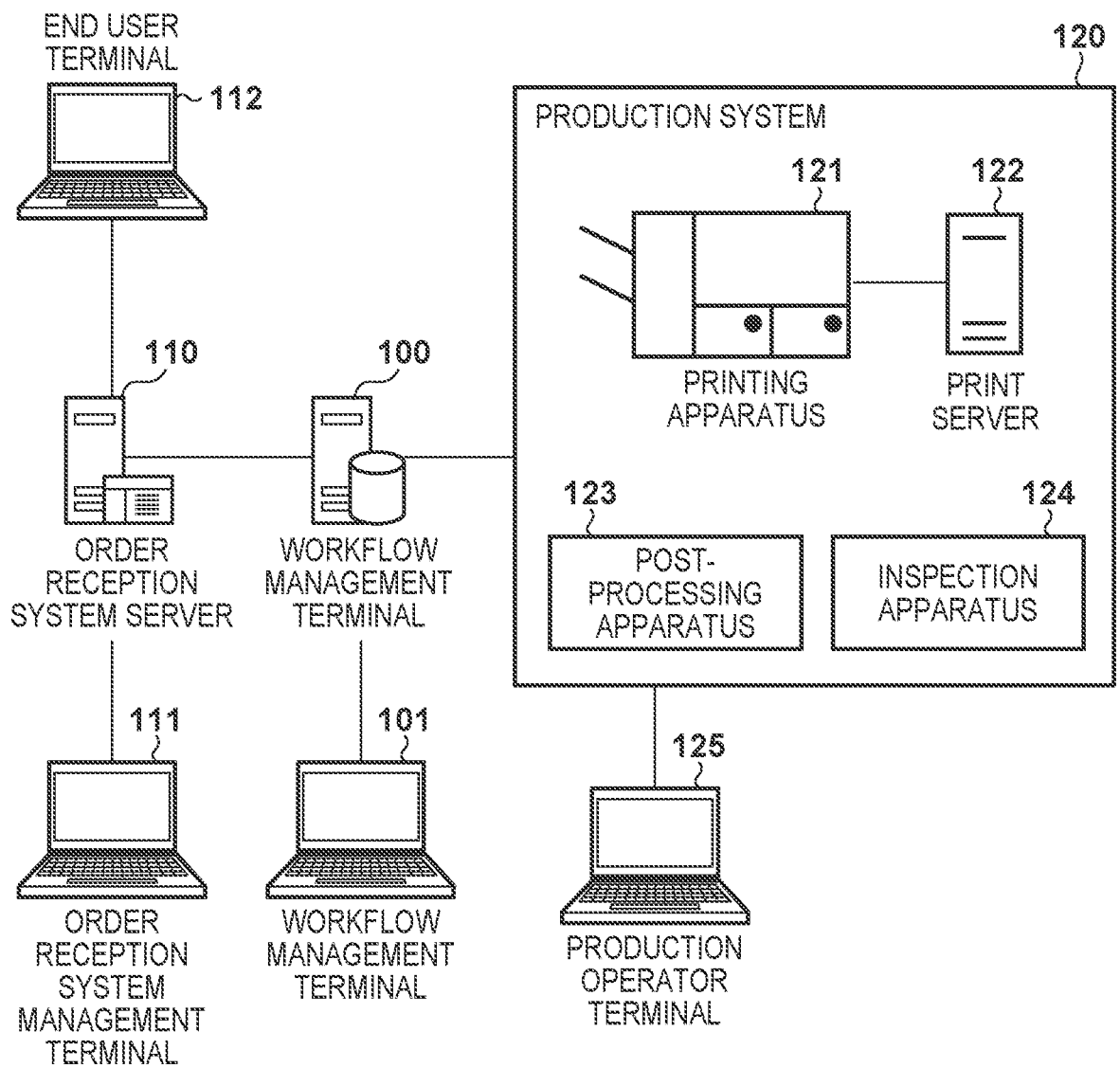
FIG. 2 is a schematic diagram for describing an overall configuration of a system according to an embodiment.

Next, with reference to FIG. 2, an example of a configuration of a commercial printing system according to the present embodiment will be described. This commercial printing system is configured to include the workflow management server 100, a workflow management terminal 101, the order reception system server 110, an order reception system management terminal 111, an end user terminal 112, the production system 120, and a production operator terminal 125. These configurations are only one example, and are not intended to limit the present invention. In other words, the present invention can be configured to include another apparatus.

The workflow management server 100 is an example of an information processing apparatus, and regarding the commercial printing product, is an apparatus that manages the overall workflow. The workflow management server 100 receives PRX data which is print data and quality requirement data from the order reception system server 110, interprets the print data received from the order reception system server 110, and decides the workflow in the production system 120 for each job order. Furthermore, for spot color data that is designated in the PRX data, based on color setting information obtained from the production system 120, the optimal print settings (output color profile) is decided. The workflow management server 100 generates data (print data, a job ticket, operation setting information, a control instruction recited in FIG. 1) to be processed on the production system 120, and transmits the data to each device configuring the production system 120. As for devices comprised by the production system 120, they will be described later. Furthermore, the workflow management server 100 transmits to the production system 120 PRX data that it received from the order reception system server 110.

When the workflow management server 100 receives a PQX from the production system 120 after printing is executed, it transmits it to the order reception system server 110.

Note that the present embodiment describes the workflow management server 100 as being an on-premises server that is established as a site for performing workflow management, but the invention is not limited to this. As another embodiment, the workflow management server 100 may be configured to be constructed as a cloud server and be connected via the Internet from the workflow management terminal 101 which is described later. It is similar for the order reception system server 110 that will be described later.

The workflow management terminal 101 is a terminal that the workflow administrator operates, and connects via a network to the workflow management server 100, and executes each type of function. Specifically, the workflow management terminal 101 performs a change in the setting of the workflow management function and performs a confirmation of the state of the devices in the production system 120.

The order reception system server 110 is an apparatus that manages a system for receiving an order from an end user regarding a commercial printing product. The order reception system server 110, in accordance with a product for which an order is received and content of the order from the end user, generates print data and PRX data, and transmits it to the workflow management server 100. Furthermore, the order reception system server 110 receives a PQX from the workflow management server 100.

The order reception system management terminal 111 is a terminal that an order reception system administrator operates and the order reception system management terminal 111 connects to the order reception system server 110 via a network and executes the respective functions. Specifically, the order reception system management terminal 111 executes functions such as requested quality setting by product, status confirmation for each job order, and viewing of product quality information for each job order. The end user terminal 112 is a terminal that the end user operates and connects to the order reception system server 110 via the network. Also, the end user terminal 112 selects a product from a UI such as the Web browser, transmits original data, receives an instruction such as an order from an end user, and transmits such information to the order reception system server 110.

The production system (manufacturing apparatus) 120 is a system for producing products (resulting document) in commercial printing after receiving an order from the end user. In detail, the production system 120 is configured to include an apparatus such as a printing apparatus 121, a print server 122 for controlling the printing apparatus 121, a post-processing apparatus 123, an inspection apparatus 124, and the like. The printing apparatus 121 and the print server 122 are connected by a network or a dedicated interface. In the present embodiment, the post-processing apparatus 123 and the inspection apparatus 124 will be described as being in a nearline configuration in which they are connected with other devices by a network. However, this is not intended to limit the present invention, and an offline configuration in which they operate independently may be taken. In the case of an offline configuration, the post-processing apparatus 123 and the inspection apparatus 124 connect with an operation terminal (not shown) that can connect with a network, and via the operation terminal, connect to the network. In either case, each apparatus included in the production system 120 connects with the workflow management server 100 via the network, and performs transmission/reception of each type of information.

Note that the production system 120 can also be configured to include only some of or none of the print server 122, the post-processing apparatus 123, and the inspection apparatus 124, or can be configured to include these devices in a single apparatus. In other words, it is sufficient that the production system 120 be of a configuration that has at least the function of the printing apparatus 121, and the printing apparatus may include functions of other devices, and may be of a form in which it connects separately as illustrated in FIG. 2. The production system 120 analyzes the PRX data received from the workflow management server 100, and specifies print quality requirements and pre-press processing.

The printing apparatus 121 is an apparatus for executing printing processing based on data and an instruction from the workflow management server 100. The print method need not be particular limited, and may be an electrographic method, an inkjet method, or any other method. An administrator or an operator of the production system 120 is able to instruct control related to printing via a UI of the printing apparatus 121. The print server 122 is a server for controlling the printing apparatus 121. Similarly to a typical printing system, an administrator or operator of the production system 120 can instruct control related to printing via the UI of the print server 122.

The post-processing apparatus 123 is an apparatus for performing post-processing in relation to already printed sheets and sheet bundles. For example, this may be creasing or folding of sheets, or trimming or binding processing on sheet bundles. The inspection apparatus 124 is an apparatus for executing processing such as detecting a problem in a final product or intermediate product, notifying a user, and excluding that product from the manufacturing line. The production operator terminal 125 is an apparatus used by the operator who operates various devices of the production system 120 described above. The apparatus comprises functions such as confirming the operation state of devices or confirming error information when an error occurs. As another form, a configuration may be taken so that a UI operation unit comprised by each device rather than an external terminal is responsible for these functions.

<Hardware Arrangement>

Figure 3:
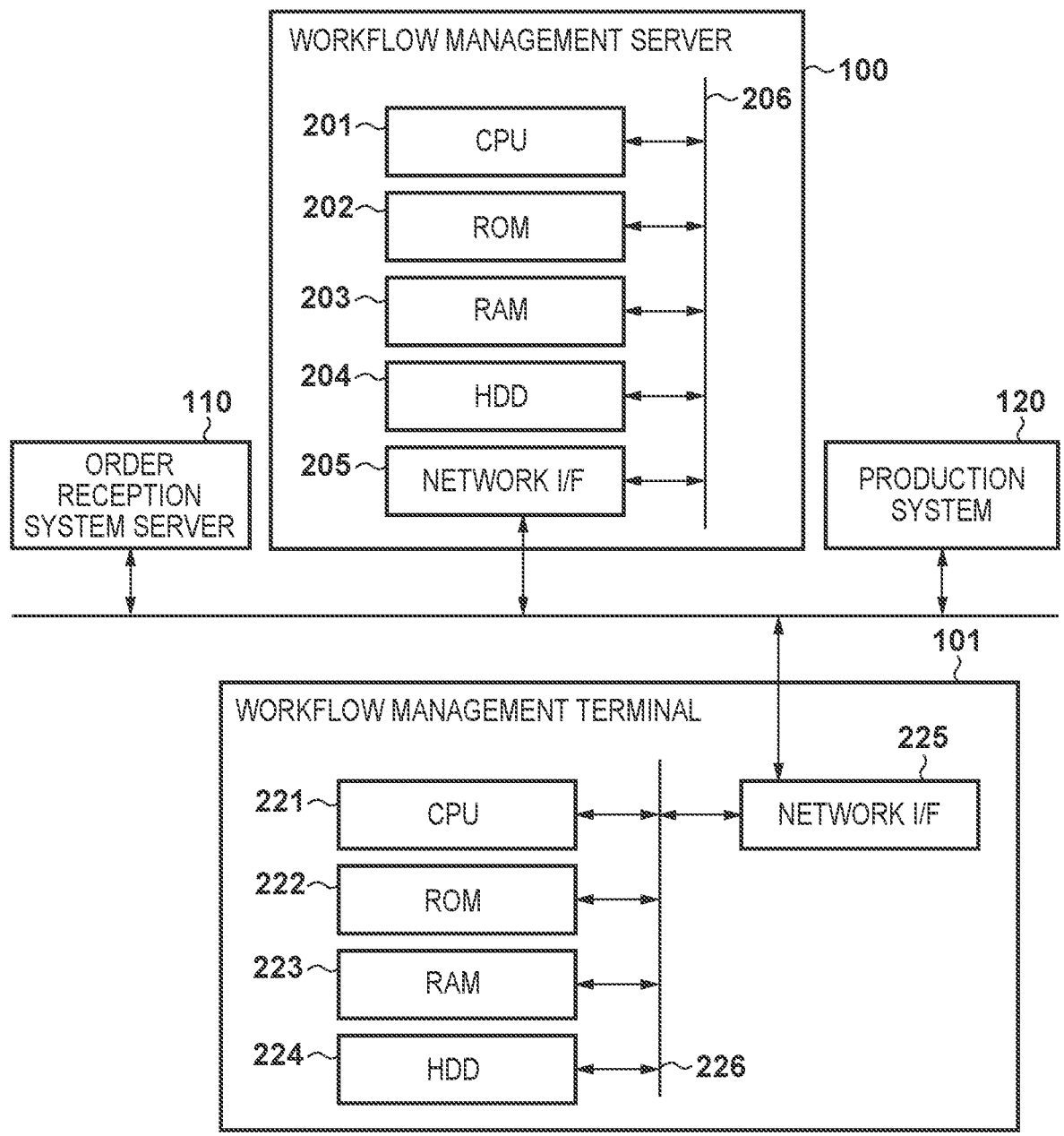
FIG. 3 is a block diagram for describing a hardware configuration of a workflow management system according to an embodiment.

Next, a hardware configuration of each type of apparatus related to the present embodiment will be described. FIG. 3 illustrates a hardware configuration of the workflow management system including the workflow management server 100 and the workflow management terminal 101 according to the present embodiment. Note that in the case of the order reception system server 110, since the hardware configuration is similar to the workflow management server 100 described below, the description will be omitted.

Firstly, a hardware configuration of the workflow management server 100 is described. The workflow management server 100 includes a CPU 201, a ROM 202, a RAM 203, an HDD 204, and a network I/F 205. The CPU 201 loads a control program stored in the ROM 202 or the hard disk (HDD) 204 into the RAM 203, and executes the loaded program to control access to each type of device connected to a system bus 206. The ROM 202 stores, for example, the control program that the CPU 201 is able to execute. The RAM 203 mainly functions as a main memory, a work area, or the like of the CPU 201, and is configured to be able to expand the memory capacity by an option RAM connected to an expansion port (not shown). The hard disk (HDD) 204 stores a boot program, various applications, font data, user files, and editing files, or the like. Note that an example in which the HDD 204 is used will be described in the present embodiment, but instead of an HDD, an external storage apparatus such as an SD card or a flash memory may be used. The same also applies to apparatuses having an HDD described hereinafter. The network I/F 205 performs data communication with various apparatuses via a network.

Next, a hardware configuration of the workflow management terminal 101 will be explained. Note that the hardware configuration of other terminal apparatuses such as the order reception system management terminal 111, the end user terminal 112, and the production operator terminal 125 is similar to the workflow management terminal 101 described below, and so description thereof will be omitted.

The workflow management terminal 101 comprises a CPU 221, a ROM 222, a RAM 223, an HDD 224, and a network I/F 225. The CPU 221 loads, into the RAM 223, a control program stored in the ROM 222 or the hard disk (HDD) 224, and controls access with various devices connected to a system bus 226 by executing the loaded program. The ROM 222 stores control programs and the like that the CPU 221 can execute. The RAM 223 mainly functions as a main memory, a work area, or the like, of the CPU 221 and is configured such that a memory capacity can be extended by an option RAM connected to an expansion port (not shown). The hard disk (HDD) 224 stores a boot program, various application, font data, user files, and editing file or the like. The network I/F 225, via the network, performs data communication with other apparatuses.

Figure 4:
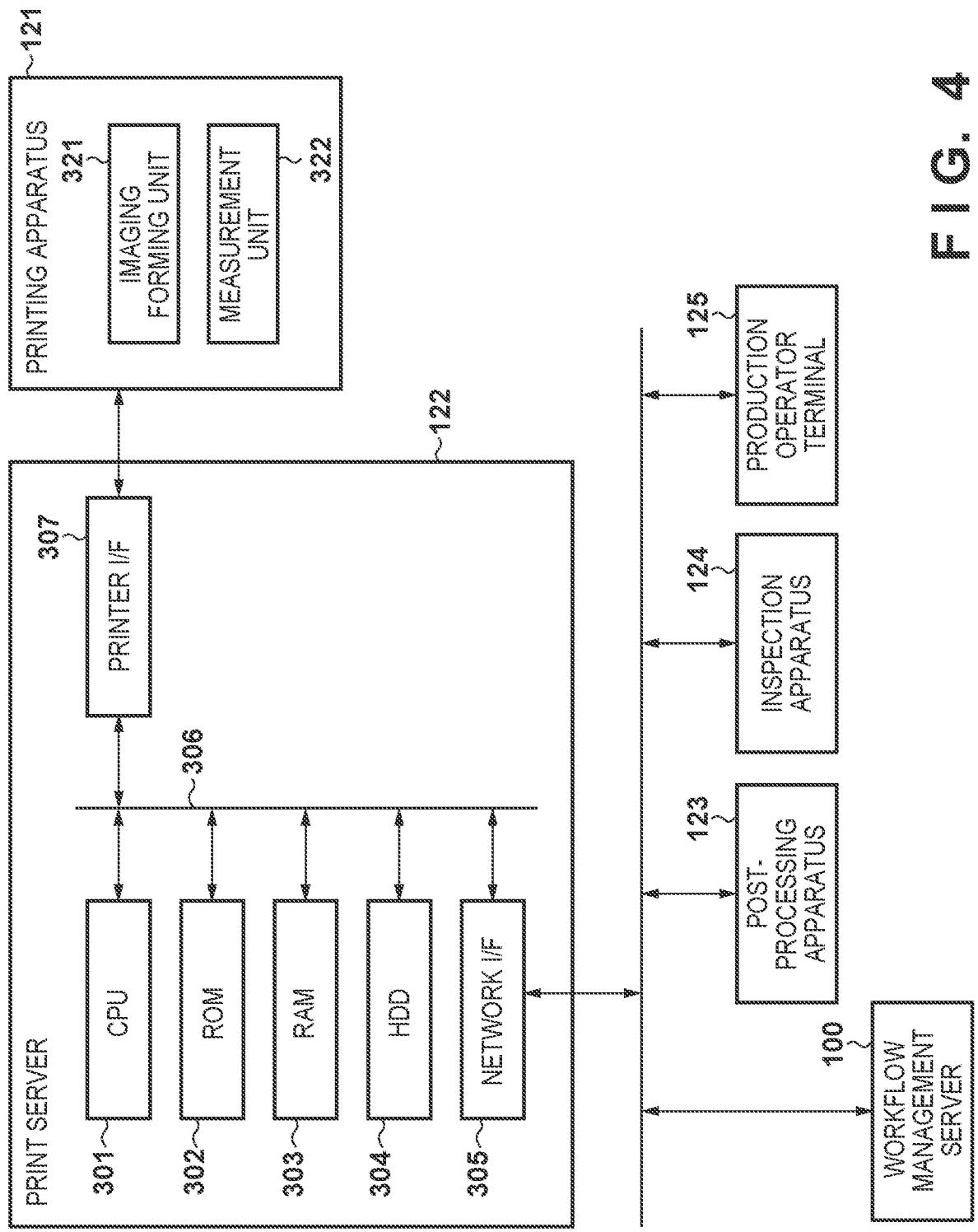
FIG. 4 is a block diagram for describing a hardware configuration of a production system according to an embodiment.

FIG. 4 illustrates a hardware configuration of each apparatus included in the production system 120 according to the present embodiment. The print server 122 comprises a CPU 301, a ROM 302, a RAM 303, an HDD 304, a network I/F 305, and a printer I/F 307.

The CPU 301 loads a control program stored in the ROM 302 or the hard disk (HDD) 304 into the RAM 303, and executes the loaded program to control access to each type of device connected to a system bus 306. The ROM 302 stores control programs or the like which the CPU 301 can execute. The RAM 303 mainly functions as a main memory, a work area, or the like of the CPU 301, and is configured to be able to expand the memory capacity by an option RAM connected to an expansion port (not shown). The hard disk (HDD) 304 stores a boot program, various applications, font data, user files, editing files, and the like. The network I/F 305, via the network, performs data communication with other apparatuses. The printer I/F 307 controls the output of images to the image forming unit 321 of the printing apparatus 121. Also, the printer I/F 307 controls the measurement unit 322 arranged inside the printing apparatus 121, and receives measurement results.

The printing apparatus 121 comprises the image forming unit 321 that is responsible for at least the print operation and the measurement unit 322. Additionally, the configuration may be such that the sheet feeding apparatus (not shown) and the inline post-processing apparatus is connected to the printing apparatus 121. The image forming unit 321 outputs print data to a sheet. The hardware configuration is the same for the general printing apparatus 121. The measurement unit 322 follows an instruction of the print server 122 or the printing apparatus 121 itself, and the image forming unit 321 measures the print product to be generated. The measurement pattern may use a conventional measurement pattern such as a spectral color measurement, a density measurement, a CCS scan, and a CIS scan. Note that in the present embodiment, the measurement unit 322 is described as something that is arranged in the printing apparatus 121, but the invention is not intended to be limited to this. For example, a configuration may be taken so that the measurement unit 322 on its own connects to the network independently of the printing apparatus 121. Alternatively, a configuration may be such that the measurement unit 322 is connected with an operation terminal (not shown) that can connect to the network, and connect to a network via the operation terminal. In either case, the measurement unit 322 connects with the workflow management server 100 via the network, and performs transmission/reception of various information.

<Software Arrangement>

Figure 5:
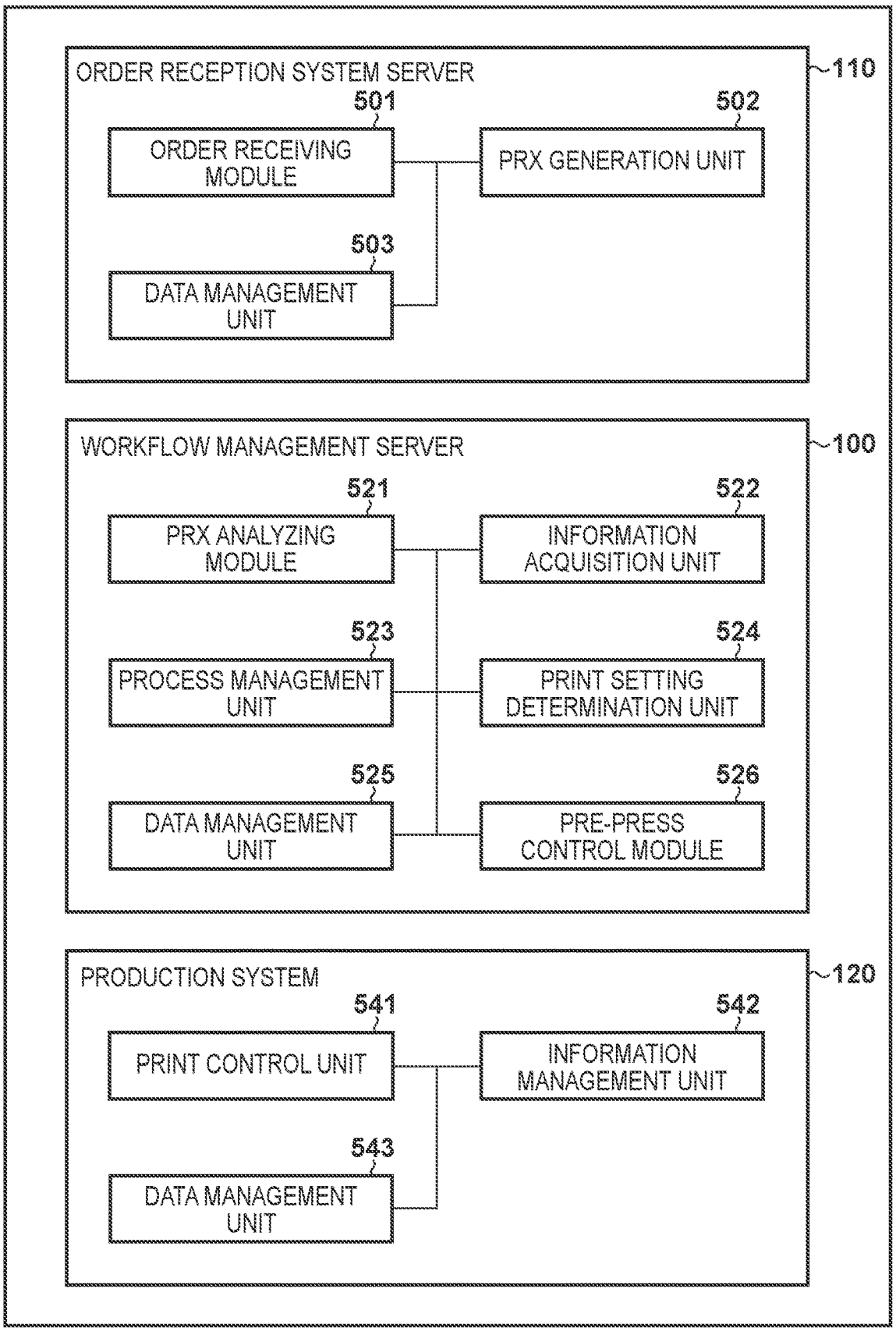
FIG. 5 is a view illustrating a software configuration according to an embodiment.

Next, with reference to FIG. 5, description will be given for the software configuration of each type of apparatus according to the present embodiment. FIG. 5A illustrates the software configuration of the order reception system server 110 according to the present embodiment. These software modules are realized by storing a program in an HDD (not shown), and by a CPU (not shown) deploying this program in a RAM (not shown) and executing the program.

The order reception system server 110 includes, as software modules, the order receiving module 501, the PRX generation module 502, and the data management unit 503. The order receiving module 501 receives product order information from the end user terminal 112 via the network. The order information includes product type information, received image data, and request information according to quality. Note that, in the present embodiment, the PDF format data is described as an example of input data, but the invention is not limited to this. In other words, the production system 120 may be of a form in which it handles image data of another typical format that can be interpreted. The PRX generation module 502 analyzes the order information that is received from the order receiving module 501 and generates the PRX data. The data management unit 503 records information such as order information, PRX data, and PQX data in a memory (not shown). Also, the data management unit 503 transmits to the workflow management server 100 inputted image data, product type information, and PRX data. Furthermore, the data management unit 503 executes other data transmission/reception with various apparatuses.

FIG. 5B illustrates a software configuration of the workflow management server 100 according to the present embodiment. These software modules are stored in the HDD 204 as programs and are implemented by the CPU 201 deploying and executing the programs in the RAM 203.

The workflow management server 100 includes, as a software configuration, a PRX analyzing module 521, an information acquisition unit 522, a process management unit 523, a print setting determination unit 524, a data management unit 525, and a pre-press control module 526. The PRX analyzing module 521 analyzes the PRX data received from the order reception system server 110, and specifies print quality requirements and parts of the pre-press processing that is required. A print quality requirement, for example, requires that a mean color difference obtained from a pre-determined color patch measurement result falls inside a specific standard. Also, the pre-press processing, for example, is processing that adds a color patch image that is a color measurement target by color quality confirmation processing to a margin portion of image data.

The information acquisition unit 522 makes a query to the production system 120 on information related to the print setting item set for a print job and obtains the information (production system information). Note that, as described above, it is advantageous that the timing of the query be a periodic timing of, for example, once per day, once per week, or the like. By virtue of the present embodiment, the above-described production system information is made to include at least color profile information that can bet set by the production system 120. Furthermore, the information acquisition unit 522 transmits, to the process management unit 523, the obtained color profile information.

The process management unit 523, by using product type information received from the order reception system server 110 and analysis result information of the PRX analyzing module 521, decides the production system 120 and executes commands to the pre-press control module 526. Note that in the present embodiment, in order to simplify the description, a printing system including only one production system 120 is described; however, actually, there may be multiple production systems, and the production system into which a received print job order is to be inputted may be decided from among them. Also, the process management unit 523 transfers production system information (including the color profile information and the like), obtained in the PRX information and the information acquisition unit 522, to the print setting determination unit 524 which decides the print settings for the print job. The print setting determination unit 524, based on the production system information, decides print setting items in relation to the print data. For example, the print setting determination unit 524 decides the optimal color profile based on the obtained color profile information of the production system 120 if there is information related to a spot color in the PRX information. In this way, in the present embodiment, in the case where there is spot color data designated by the PRX, the optimal color profile to be set for the spot color data is decided in accordance with production system information obtained in the information acquisition unit 522. Details of this will be described below.

Also, the process management unit 523 generates job ticket data that the respective devices reference in the production system 120. In the present embodiment, conventional JDF data is described as being used as the job ticket data, but the invention is not limited to this. In other words, a configuration may be such that another conventional job ticket data format that the production system 120 can interpret is used. Also, the process management unit 523 references PRX information, and generates operation setting information of the post-processing apparatus 123 or the inspection apparatus 124. Furthermore, the process management unit 523 transmits the PDF data, the JDF data, and operation setting information of each device after the pre-press processing (described later) to the production system 120.

The data management unit 525 transmits, to the production system 120, the PDF data, JDF data, and instruction information for each type of apparatus that configures the production system 120. Note that data when inputting a print job into the production system 120, including PDF data, JDF data, and instruction information, will be referred to by the generic term of job data. The data management unit 525 executes other data transmission/reception with the respective apparatuses. The pre-press control module 526 controls pre-press processing specified after the PRX data is analyzed by the PRX analyzing module 521. For example, the pre-press control module 526, in accordance with the specified pre-press processing, embeds the pre-press processing as necessary in the workflow that the production system 120 executes.

FIG. 5C illustrates a software configuration of the production system 120 according to the present embodiment. In each of the various devices which configure the production system 120, these software modules are realized by storing a program in the HDD 304, and the CPU 301 deploying the program to the RAM 303 and executing the program. Note, although the production system 120 includes the printing apparatus 121, the print server 122, the post-processing apparatus 123, and the inspection apparatus 124, these four pieces of hardware will be considered and described as one piece of hardware called the production system 120 in the present embodiment. Accordingly, the software modules included in the production system 120 described below may be implemented in any apparatus.

The production system 120 includes a print control unit 541, an information management unit 542, and a data management unit 543 as software modules. The print control unit 541 uses information (PDF, JDF) received from the workflow management server 100 and executes print control. Also, the print control unit 541 has an adjustment function for adjusting the print quality, and in accordance with a control instruction received from one of the workflow management server 100, the print server 122, or the production operator terminal 125, executes the adjustment functions. Also, the print control unit 541 has a measurement control unit 5411. The measurement control unit 5411, in accordance with a control instruction received from one of the workflow management server 100, the print server 122, or the production operator terminal 125, executes measurement control by the measurement unit 322.

The information management unit 542 uses memory of the HDD 304 to manage information such as print settings in the production system 120, and performs processing as necessary. As one example of the information to be managed, in the present embodiment, there is color profile information for which a print setting can be made, which is production system information. The data management unit 543 transmits information such as a control result of each kind of device of the production system 120 to the workflow management server 100. Furthermore, the data management unit 543 executes other data transmission/reception with various apparatuses. Note that the data management unit 543 may be of a form in which it is arranged in each device individually.

<ICC Color-Conversion Process>

Figure 9:
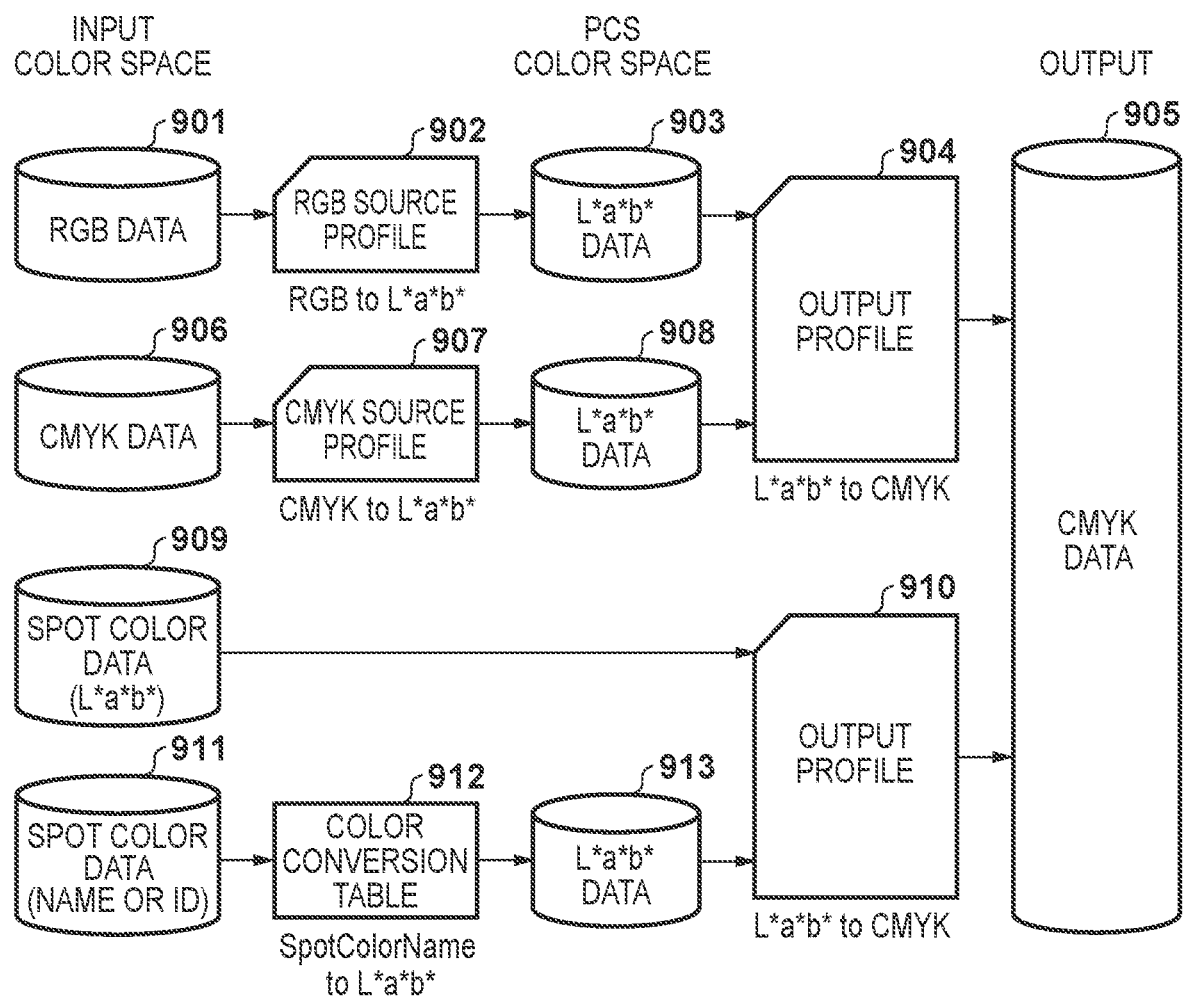
FIG. 9 is a view representing an overview of a color-conversion process that uses an ICC profile according to an embodiment.

Here, with reference to FIG. 9, description will be given of a print-data color-conversion process according to the present embodiment. FIG. 9 illustrates an overview related to the color-conversion process in relation to the print data. The process described below is executed as processing on print data in the print control unit 541 in the production system 120, for example.

In printer color-conversion processing, typically, a profile format and a color management module (CMM) of a standard that ICC (International Color Consortium) proposed is used. The target profile is called an ICC profile. By using an ICC profile, it becomes possible to perform a color conversion corresponding to various color spaces of various input/output devices by performing a color conversion using two profiles such as a source profile and an output profile, as illustrated in FIG. 9.

The ICC profile is used to convert color image data defined to correspond to a color space of one device into color image data defined to correspond to a color space that is unique to each device or a device independent color space PCS (Profile Connection Space). Known PCS color spaces are, for example, L*a*b* and XYZ. For example, in the case where the print data 901 including RGB data is inputted, using an ICC profile 902 called an RGB source profile, it is converted into device-independent PCS color space data (L*a*b* here) 903. Furthermore, by using the ICC profile 904, the L*a*b* data is converted into CMYK data 905 which is to be outputted by the printing apparatus 121.

Also, as another example, in the case where print data 906 including the CMYK data is inputted, it is converted into a device-independent PCS color space data (L*a*b* here) 908 by using an ICC profile 907 called the CMYK source profile. After that, using the ICC profile 904, the L*a*b* data is converted into CMYK data 905 to be outputted by the printing apparatus 121. In the case where print data including spot color data 909 is inputted, using the ICC profile 910, in relation to PCS color space data defined for the spot color data, the L*a*b* data is converted into CMYK data 905 to be outputted by the printing apparatus 121. Here, the spot color data is typically held directly in PCS color space data form, but it may be in another form. For example, a form in which the printing apparatus 121 and the print server 122 hold a spot color conversion table 912 in which the spot color name or ID and PCS color space data information are associated can be considered. In such a case, in relation to the input print data 911 for which the spot color name or ID information are held, it is possible to use the above-mentioned spot color conversion table 912 to perform a conversion into the PCS color space data 913.

<Sequence>

Figure 6:
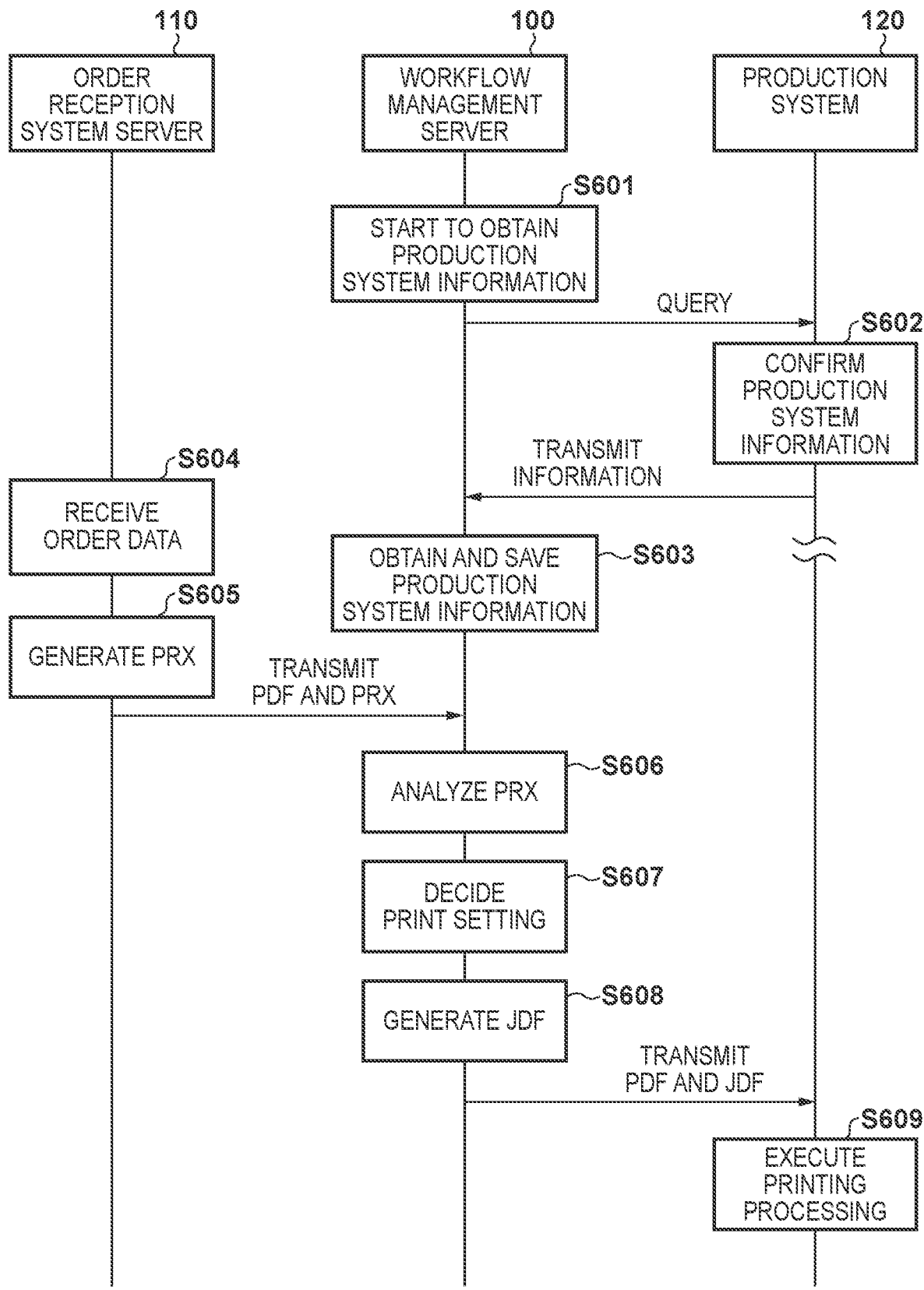
FIG. 6 is a sequence diagram illustrating a processing procedure for a time of printing according to an embodiment.

Next, with reference to FIG. 6, a sequence for printing processing according to the present embodiment will be described.

In step S601, the information acquisition unit 522 of the workflow management server 100 starts to obtain production system information from the production system 120, and makes a query to the production system 120. It is advantageous that the timing of the query (request) be a periodic timing of, for example, once per day, once per week, or the like. For example, it is advantageous to obtain the latest information of the production system 120 such as by starting the obtainment at a specific time every day. By this, together with being able to obtain the latest information periodically, it is possible to reduce the processing time when printing compared with a case where it is obtained when the print order is actually received. Next, in step S602, the information management unit 542 of the production system 120 confirms the production system information. The production system information confirmed here is output color profile information that can be set by the print control unit 541, for example. Specifically, the information management unit 542 obtains, as production system information, one or more pieces of profile information related to print output of the self-apparatus from the information managed in the HDD 304 or the like of the print server 122. Furthermore, the production system 120 transmits the obtained production system information to the workflow management server 100 via the data management unit 543. In step S603, the information acquisition unit 522 of the workflow management server 100 saves the obtained production system information into the data management unit 525.

In step S604, the order receiving module 501 of the order reception system server 110 receives an order from an end user. The received order is PDF print data and request information related to the product, and it is possible to receive it from an operation unit (not shown) of the order reception system server 110. Next, in step S605, the PRX generation module 502 of the order reception system server 110 generates PRX from the received print data and product request information. When the PRX are generated, the data management unit 503 transmits, to the workflow management server 100, the generated PRX data together with the print data.

Next, in step S606, the PRX analyzing module 521 of the workflow management server 100 analyzes the PRX data received from the order reception system server 110. Specifically, the product request information designated in the PRX is read in, and in the case where there is a Color in a set QualityGoal, the content thereof is confirmed. The details of PRX will be described later using FIG. 11. Next, in step S607, the print setting determination unit 524 of the workflow management server 100, based on the flowchart of FIG. 7 which will be described later, decides an output color profile to be set in relation to the spot color data designated in the print job. Furthermore, in step S608, the process management unit 523 of the workflow management server 100 generates a JDF in which the necessary information is recorded in order to execute printing on the production system 120. The above-described necessary information includes output color profile information set in relation to the spot color data included in the print job. Here, the data management unit 525 transmits job data including the PDF data and the generated JDF data to the production system 120.

In step S609, the print control unit 541 of the production system 120 executes printing processing based on the received job data, specifically the PDF data and the JDF data. When the printing processing is completed, the PQX data is generated by the inspection apparatus 124, and the PQX data is transmitted to the workflow management server 100. Note that in the case where the post-processing is set, the post-processing is executed by the post-processing apparatus 123.

<PRX Description>

Figure 11:
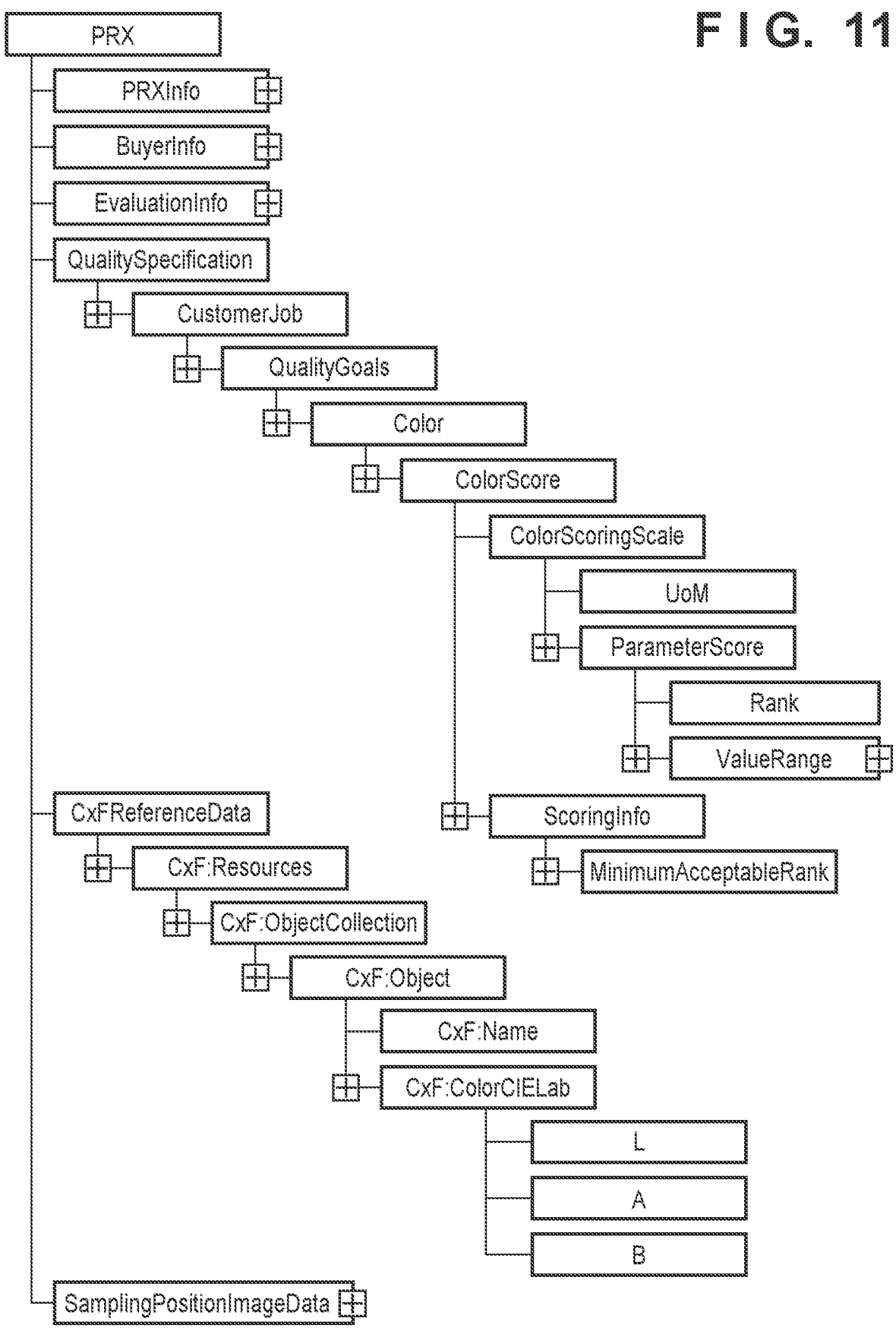
FIG. 11 is a view illustrating an example of a PRX configuration.

Here, with reference to FIG. 11 and FIG. 12, PRX will be described. FIG. 11 illustrates PRX configuration information in the present embodiment, and FIG. 12 illustrates an example of actual PRX data. The PRX is data described in an XML, text format, for example, and normally one PRX is associated with the print data. The PRX is configured based on information of a desire or request in relation to each type of quality from the customer.

PRXInfo is a PRX element. PRXInfo is configured by identification information (for example, "JOB201906080020") for identifying PRX such as the ID and name of the PRX. Buyerinfo is a PRX element. Buyerinfo is configured by information of a customer that ordered with the print data (for example, XYZ Travel Inc.).

EvaluationInfo is a PRX element. EvaluationInfo is configured by information related to a quality evaluation that a customer uses such as a definition of an arithmetic formula that is to be used for evaluation. It is possible to designate information (a threshold) such as an allowable range in relation to the quality. For the above-mentioned threshold, an upper limit value and a lower limit value may be respectively set.

QualitySpecification is a PRX element. QualitySpecification is configured by a quality target with respect to an evaluation item and information related to an evaluation standard. CustomerJob is a QualitySpecification element.

CustomerJob is configured by information related to a print job in relation to a requested quality item. QualityGoals is a CustomerJob element. QualityGoals is configured by information related to a target of the print quality that the customer specifies. Color is a QualityGoals element. QualityGoals is configured by information used in the case where the requested quality that the customer specifies is a color.

Other than color, items that are specific to different requested qualities such as Registration and Barcode also are present in parallel. ColorScore is an element of the above-mentioned Color. ColorScore is configured by information related to the requested quality related to the color that the customer specifies. ColorScoringScale is one ColorScore element. ColorScoringScale is configured by information related to the scale of the score of the requested quality handled by ColorScore.

UoM is a ColorScoringScale element. UoM designates the units of the numbers handled by that element. For example, when the parameter dE2000 is set, a numerical value that adds a score by ColorScoringScale means that the units related to color difference of dE2000 will be used. ParameterScore is a ColorScoringScale element. ParameterScore is configured by information related to the score of the requested quality handled by ColorScore. Rank is a ParameterScore element. Specific rank information of the requested quality is represented. ValueRange is a ParameterScore element. The specific number of the requested quality is represented. ScoringInfo is a ColorScore element. ScoringInfo is configured in relation to ColorScore which is designated by a ColorScoringScale element. MinimumAcceptableRank is an element of ScoringInfo. The minimum rank for which a requested quality can be accommodated is indicated.

CxFReferenceData is a configuration that conforms to a Color Exchange Format, and is mainly configured by information related to color. It is possible to set color space information as appropriate, and save $L^*a^*b^*$ information by designating CxF:ColorCIELab as illustrated in FIG. 12, for example.

SamplingPositionImageData is a PRX element. SamplingPositionImageData is configured by information related to the specific image data position.

<Print Setting Determination Processing>

Figure 7:
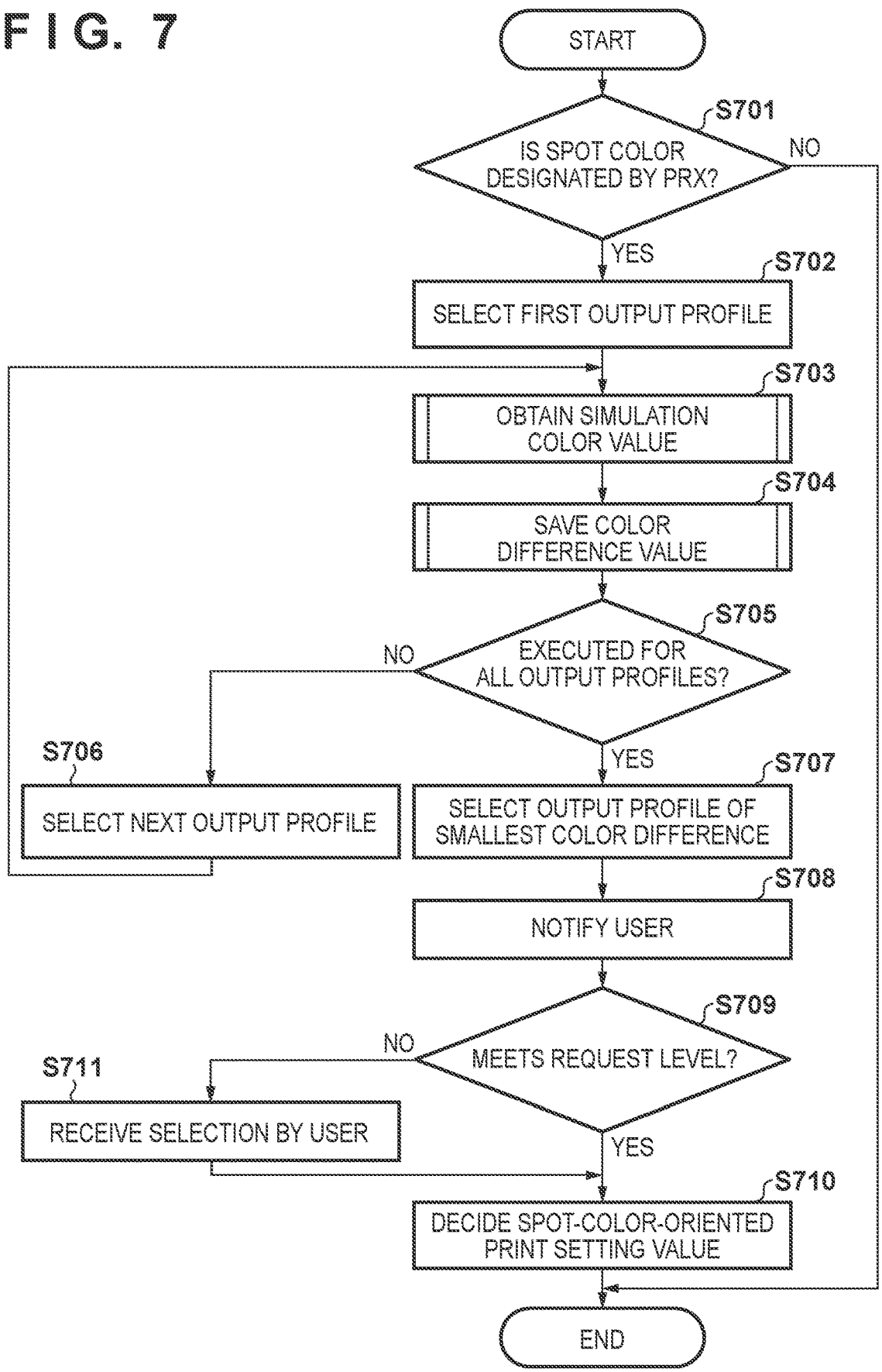
FIG. 7 is a flowchart illustrating a procedure for print setting determination processing according to an embodiment.

Next, with reference to FIG. 7, a processing procedure for the output color profile setting determination processing in the print setting determination processing (step S607) according to the present embodiment is described. The processing described below is implemented when, for example, the CPU 201 loads a control program stored in the ROM 202 into the RAM 203 and executes it. Below, the output color profile is referred to simply as output profile.

In step S701, the print setting determination unit 524 references the analysis result of having analyzed the PRX data in step S606 above, and determines whether or not a predetermined quality item, for example the spot color, is designated. Here, in a case where the spot color is not designated in the PRX, the present flow ends, and if the spot color is designated, the processing advances to step S702. In step S702, the print setting determination unit 524 obtains production system information in step S603 described above, and selects a first output profile from among one or more saved output profiles. Next, in step S703, the print setting determination unit 524 obtains a spot color simulation color value based on the designated spot color information and output profile information selected in step S702. In other words, the spot color simulation color value indicates a prediction value for an output value of spot color data when printing is executed on the production system 120 by using the designated spot color data and the output color profile.

Figure 10:
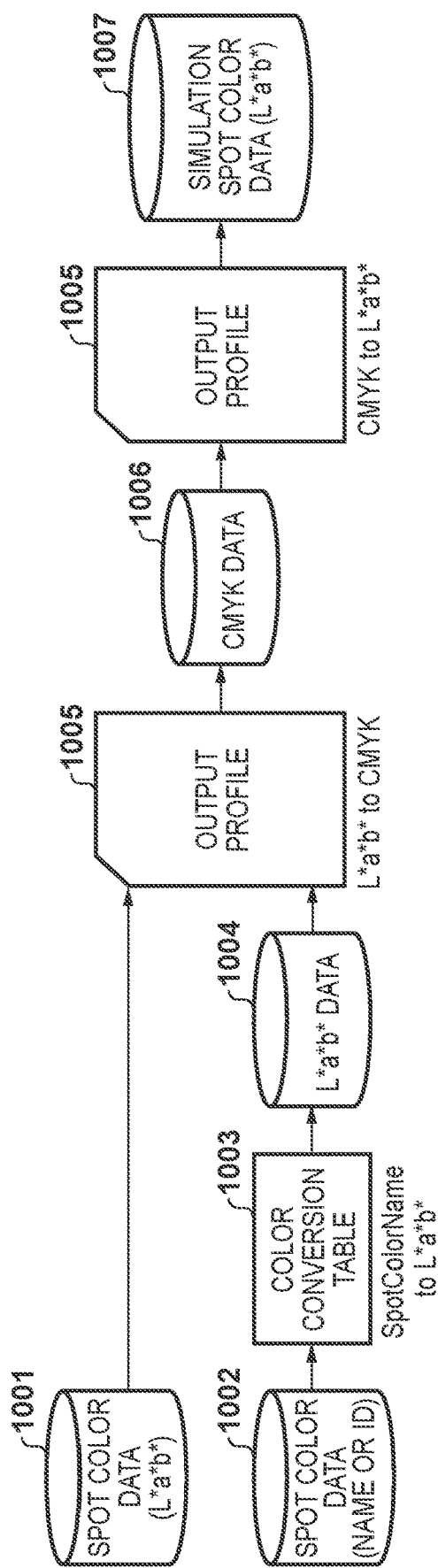
FIG. 10 is a view that represents an overview of a spot color simulation process according to an embodiment.

Here, using FIG. 10, processing for obtaining a spot color simulation color value will be described. FIG. 10 indicates an overview of processing for obtaining spot color data simulation in the present embodiment. The processing illustrated in FIG. 10 is executed in the print setting determination unit 524 in the workflow management server 100. Reference numerals 1001 and 1002 denote spot color data designated in the PRX data obtained by analyzing the PRX data. Reference numeral 1001 denotes a case where L*a*b* data which is one PCS color space data is designated and reference numeral 1002 denotes a case where a name or ID is designated. In the PRX data, configuration may be taken so that the formats of 1001 or 1002 may be is designated. Note that the present invention does not particularly exclude the application of other formats. In the case the name or the ID are designated, as mentioned previously, they are converted into the L*a*b* data 1004 via the color conversion table 1003.

Next, the print setting determination unit 524 converts the spot color data 1001 and 1004 as L*a*b* data into the CMYK data 1006 by using the output profile 1005 selected in step S702 or in step S706. Furthermore, the print setting determination unit 524 converts the converted CMYK data 1006 into L*a*b* data by using the same output profile 1005 again. The L*a*b* data after the conversion here is simulated spot color data 1007. Accordingly, by converting the color value to be actually outputted as the spot color data into CMYK data in accordance with the output profile, device-dependent color space data specific to the printing apparatus 121 which actually performs the output is the result. By converting the data mapped to the device-dependent color space into L*a*b* data by the same output profile again, it is possible to obtain color values in the case where target spot color data is outputted by the printing apparatus 121.

The description will return to FIG. 7. In step S704, the print setting determination unit 524, based on the color values of the spot color simulation obtained in step S703 and the color value of the designated spot color information, obtains a color difference and saves it in the data management unit 525. When color values of the spot color information are made to be L*, a*, b* and the spot color simulation color values are made to be L'*, a'*, b'*, the color difference deltaE can be obtained by Equation 1 below.
deltaE=sqrt((L*−L'*)^2+(a*−a'*)^2+(b*−b'*)^2) . . . Equation 1 This arithmetic formula is known as a typical method for calculating a color difference value, but of course the invention is not limited to only this arithmetic formula and another method may also be employed.

Next, in step S705, the print setting determination unit 524 determines whether or not the processing of step S703 and step S704 is executed for all of the output profiles obtained as production system information. In the case where there is another profile that has still not been executed (NO in step S705), the processing advances to step S706, and the print setting determination unit 524 selects the next output profile, and returns the processing to step S703. Meanwhile, in the case where in step S705 it is determined (YES in step S705) that processing has been executed for all of the output profiles, the processing advances to step S707, and the print setting determination unit 524 selects the output profile of the smallest color difference among the color difference values obtained from all of the output profiles. Next, in step S708, the print setting determination unit 524 notifies the user of information of the output profile which is the processing result and the minimum color difference.

Here, with reference to FIG. 8, an example of a UI screen that is to be presented to a user in the above-described step S708 will be described. The UI 801 illustrated in FIG. 8 is generated by the CPU 201 of the workflow management server 100, and is displayed on the operation unit (not shown) of the workflow management server 100. Alternatively, configuration may be of a form in which the UI 801 is transferred to the workflow management terminal 101, and displayed on the operation unit (not shown) of the workflow management terminal 101, and configuration may be taken so as to transmit the UI 801 to another apparatus and to display the UI 801 thereon.

The UI 801 is a screen that illustrates an example of spot color simulation information that is to be presented to the user. Configuration is such that the display of the reference numerals 802 to 812 is included. Note that the display content here illustrates a display example corresponding to the PRX data that is illustrated in FIG. 12. References numeral 802 is PRX ID information, and can be obtained by PRX analysis (step S606). Here, as illustrated in FIG. 12, PRXInfo is saved. Reference numeral 803 is customer information of the target print data and PRX data, and can be obtained by PRX analysis. In the present embodiment, BuyerInfo is saved.

Reference numerals 804 to 806 are information of target spot color data. Reference numeral 804 is the spot color name, and can be obtained by analysis of PRX. In the present embodiment, reference numeral 804 is saved in the Object Name of CxFReferenceData. Reference numeral 805 is the color value of spot color data, and can be obtained by PRX analysis. In the present embodiment, reference numeral 805 is saved in ColorCIELab of CxFReferenceData. Reference numeral 806 is information related to the request level (threshold) designated in relation to the spot color data, and can be obtained by PRX analysis. In the present embodiment, reference numeral 806 is saved in ColorScoringScale.

Reference numerals 807 to 810 are information of the determination results (processing results) of comparing the results of the simulation processed for each output profile processed in step S702 to step S707 above and color difference information and the request level.

The reference numeral 807 is the name of the output profile for which the processing was performed. The reference numeral 808 is information of the color difference value obtained in step S704. The reference numeral 809 is information of the simulation color value obtained in step S703. Reference numeral 810 is the result of comparing the color difference value of each output profile and the request level (threshold) indicated in step S806, and determining whether or not the condition is met. In the present embodiment, for example, the request level is designated as color difference dE=10.0, and when the color difference value is smaller than that, specifically when the output profile meets the quality standard, ○ is displayed, and when the output profile is larger, x is displayed. In other words, whether or not the quality standard for each output profile is met is displayed identifiably. The method for displaying the determination result is not limited to this method. For example, it is possible to designate a plurality of ranks for the request level in the PRX, and so it is valid to hold and display determination results of a plurality of levels. Reference numeral 811 is an item for receiving the selection of the output profile by the user. In step S711 which will be described later, a selection item is selected by a user input, and by the OK button of reference numeral 812 being pressed, the selection by the user is received, and the output profile to be ultimately used as the print setting is decided. In other words, in the UI 801, the decided output profile (in the UI 801, the user profile 2) is displayed such that it can be changed to another output profile (in the UI 801, plain paper 1, user profile 1).

The description will return to FIG. 7. In step S709, the print setting determination unit 524 determines whether or not the value of the minimum color difference selected in step S707 meets the request level designated in the PRX. In the case where the request level is determined to be met (YES in step S709), in step S710, the print setting determination unit 524 decides the output profile data for which that color difference value was obtained as spot-color-oriented print setting value, and this flow is ended.

Meanwhile, in the case where it is determined (NO in step S709) that the request level is not met in step S709, the processing proceeds to step S711, and the print setting determination unit 524 receives the selection by the user. For example, via the UI 801, the output profile is designated and the OK button 812 is pressed, and thereby the selection is received. The print setting determination unit 524, in step S710, decides, as the spot-color-oriented print setting value, the output profile designated by the received selection, and this flow ends.

As described above, the information processing apparatus according to the present embodiment receives from a printing apparatus one or more pieces of information related to that printing apparatus, and receives, from an external apparatus, print data including quality requirement data. Also, the information processing apparatus, in the case of analyzing the quality requirement data and determining that a predetermined quality item is required, decides a print setting that meets a quality standard of the predetermined quality item based on the received one or more pieces of information related to the printing apparatus. Note that the predetermined quality item indicates information related to spot color data, and the one or more pieces of information related to the printing apparatus indicates production system information including the output profile. By this, by virtue of the present embodiment, based on the quality requirement data received together with print data and information of the production system, it is possible to decide the optimal print settings (output color profile) for the predetermined quality item (spot color data) included in the print data. Therefore, by virtue of the present embodiment, it becomes possible to decide the optimal print settings without putting a burden on an operator and without the product quality level being influenced depending on the competence of the operator.

The present invention is not limited to the embodiments described above, and various variations are possible. For example, in the above embodiment, an example of using PRX as the data format in which to transfer the quality requirement content of the print data was described, but limitation is not made to that. For example, a configuration may be taken so that the quality requirement content is conveyed by a data format such as XJDF (Exchange Job Definition Format).

Also, in the above-described embodiment, a print setting for items related to a predetermined quality item such as spot color data was described, but it is possible to decide print settings considering other quality items or the like. For example, configuration may be taken so that, in the case where information (the type, the size, or the like) of a sheet to be used for printing in the quality requirement data is designated, an output color profile to be used as a print setting is selected from among output color profiles that can be used on the sheet to be used. By this, it is possible to reduce the targets for obtaining simulation color values and color difference values for the plurality output color profiles, and it is possible to reduce the processing loads thereof.

Also, in a case where, in the quality requirement data, one or more quality items are designated other than the above-described predetermined quality item, each designated quality item may be weighted, and the print setting may be decided prioritizing highly weighted quality items. For example, configuration may be taken so as to obtain simulation values for each quality item, obtain a score from the difference from the respective quality standards, obtain a total score in considering the weighting in the score, and select the best scoring print setting. Alternatively, configuration may be taken so as decide a print setting in order from the highest weighted quality item. In the case where there are multiple quality items having the highest weighting, configuration may be taken so as to decide the print setting so that the average score becomes a maximum. Accordingly, it is advantageous to decide the print settings flexibly in accordance with quality requirements from a customer.

By virtue of the present invention, it is possible to decide an optimal output color profile for spot color data included in print data based on quality requirement data received together with print data and production system information.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-049937, filed Mar. 19, 2020, which is hereby incorporated by reference herein in its entirety.

What is claimed is:

1. An information processing apparatus comprising:
at least one memory device that stores a set of instructions; and
at least one processor that executes the set of instructions to:

receive, from a printing system, output color profiles of the printing system;

receive, from an external apparatus, print data and quality requirement data designating a spot color; and select an output color profile to be used for print processing of the print data from among the received output color profiles based on the spot color designated in the received quality requirement data, wherein the selected output color profile is an output color profile of the smallest color difference value among color difference values obtained based on the spot color designated in the received quality requirement data and the received output color profiles.

2. The information processing apparatus according to claim 1, wherein the at least one processor executes instructions in the memory device to:

generate job data including the selected output color profile; and transmit to the printing system the generated job data.

3. The information processing apparatus according to claim 1, wherein the at least one processor executes instructions in the memory device to:

cause a display unit to display the selected output color profile.

4. The information processing apparatus according to claim 3, wherein the selected output color profile is displayed on the display unit such that it is possible to change to another output color profile.

5. The information processing apparatus according to claim 4, wherein the at least one processor executes instructions in the memory device to:

ultimately decide an output color profile selected by user input via the display unit.

6. The information processing apparatus according to claim 3, wherein the at least one processor executes instructions in the memory device to:

cause the display unit to display the selected output color profile and color deference.

7. The information processing apparatus according to claim 3, wherein the at least one processor executes instructions in the memory device to:

the selected output color profile and simulation color value are displayed on the display unit.

8. The information processing apparatus according to claim 1, wherein the at least one processor executes instructions in the memory device to:

interpret the quality requirement data to obtain the spot color.

9. A method for controlling an information processing apparatus, the method comprising:

receiving, from a printing system, output color profiles of the printing system;

receiving, from an external apparatus, print data and quality requirement data designating a spot color; and selecting an output color profile to be used for print processing of the print data from among the received output color profile based on the spot color designated in the received quality requirement data, wherein the selected output color profile is an output color profile of the smallest color difference value among color difference values obtained based on the spot color designated in the received quality requirement data and the received output color profiles.

10. A non-transitory computer readable program for causing a computer to execute each step of a control method for an information processing apparatus, the method comprising:

receiving, from a printing system, output color profiles of the printing system;

receiving, from an external apparatus, print data and quality requirement data designating a spot color; and selecting an output color profile to be used for print processing of the print data from among the received output color profile based on the spot color designated in the received quality requirement data, wherein the selected output color profile is an output color profile of the smallest color difference value among color difference values obtained based on the spot color designated in the received quality requirement data and the received output color profiles.

11. A printing system comprising:

at least one memory device that stores a set of instructions; and at least one processor that executes the set of instructions to:

receive, from an external apparatus, print data and quality requirement data including a spot color; and select an output color profile to be used for print processing of the print data from among output color profiles based on the spot color designated in the received quality requirement data, wherein the selected output color profile is an output color profile of the smallest color difference value among color difference values obtained based on the spot color designated in the received quality requirement data and the output color profiles.

* * * * *